United States Patent
Dong et al.

(10) Patent No.: US 10,061,417 B2
(45) Date of Patent: Aug. 28, 2018

(54) CAPACITIVE TOUCH SCREEN, METHOD OF MANUFACTURING THE SAME AND DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Xiangdan Dong, Beijing (CN); Young Yik Ko, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 0 days.

(21) Appl. No.: 15/113,274

(22) PCT Filed: Nov. 3, 2015

(86) PCT No.: PCT/CN2015/093703
§ 371 (c)(1),
(2) Date: Jul. 21, 2016

(87) PCT Pub. No.: WO2016/206270
PCT Pub. Date: Dec. 29, 2016

(65) Prior Publication Data
US 2017/0147114 A1    May 25, 2017

(30) Foreign Application Priority Data

Jun. 25, 2015 (CN) .......................... 2015 1 0358844

(51) Int. Cl.
*G06F 3/045* (2006.01)
*G06F 3/041* (2006.01)
*G06F 3/044* (2006.01)

(52) U.S. Cl.
CPC ............ *G06F 3/0412* (2013.01); *G06F 3/044* (2013.01); *G06F 2203/04103* (2013.01); *G06F 2203/04111* (2013.01)

(58) Field of Classification Search
CPC ................... G06F 3/0412; G06F 3/044; G06F 2203/04103; G06F 2203/04111
See application file for complete search history.

(56) References Cited

U.S. PATENT DOCUMENTS

| 2012/0105343 A1* | 5/2012 | Lee ............... G06F 3/044 345/173 |
| 2012/0194474 A1* | 8/2012 | Chang ............ G06F 3/044 345/174 |
| 2014/0347319 A1 | 11/2014 | Lin et al. |

FOREIGN PATENT DOCUMENTS

| CN | 103246406 A | 8/2013 |
| CN | 104199582 A | 12/2014 |

(Continued)

OTHER PUBLICATIONS

International Search Report and Written Opinion both dated Mar. 21, 2016; PCT/CN2015/093703.

*Primary Examiner* — Mark Edwards
(74) *Attorney, Agent, or Firm* — Ladas & Parry LLP (57) ABSTRACT

A capacitive touch screen, a method of manufacturing the same and a display device are provided. The touch screen includes a substrate (6), a plurality of columns of first sense units (1) and a plurality of rows of second sense units (2). At an intersection point of each column of the first sense units (1) and each row of the second sense units (2), the first connection pattern includes a first connection part (33), a (Continued)

first connection bridge (31) and a second connection bridge (32), and the second connection bridge includes a second connection part (43). The second connection part (43) has a closed annular structure, and the first connection part (33) is located inside the annular structure and is isolated from the second connection part (43). The second connection part (43) is isolated from the first sense units (1). The first connection bridge (31) is configured to connect the first connection part (33) and a first sense unit (1). The second connection bridge (32) is configured to connect the first connection part (33) and another first sense unit (1). The second connection part (43) is electrically connected with the adjacent second sense units (2) respectively. The touch screen may improve performance.

18 Claims, 3 Drawing Sheets

(56) References Cited

FOREIGN PATENT DOCUMENTS

| | | |
|---|---|---|
| CN | 104216595 A | 12/2014 |
| CN | 104932764 A | 9/2015 |

* cited by examiner

CAPACITIVE TOUCH SCREEN, METHOD OF MANUFACTURING THE SAME AND DISPLAY DEVICE

TECHNICAL FIELD

At least one embodiment of the disclosure relates to a capacitive touch screen, a manufacturing method of the capacitive touch screen and a display device.

BACKGROUND

In the prior art, a capacitive touch screen comprises a plurality of columns of first sense units and a plurality of rows of second sense unit. In each column of first sense units, every two adjacent first sense units are connected by a first connection pattern, and in each row of second sense units, every two adjacent second sense units are connected by a second connection pattern.

Currently, in order to reduce an overlapped area of the first sense unit and the second sense unit and further reduce a parasitic capacitance generated from the overlapped area, in the capacitive touch screen, a structure between connected first sense units and a structure between connected second sense units generally adopt the following structures. A first manner is that every two adjacent first sense units of each column of the first sense units are generally connected by a conductive layer pattern which is disposed in a same layer as the first sense unit and has an integral structure, and every two adjacent second sense units of each row of the second sense units are generally connected by a metal bridge. A second manner is that: every two adjacent first sense units of each column of the first sense units are generally connected by a metal bridge, and every two adjacent second sense units of each row of the second sense units are generally connected by a conductive layer pattern which is disposed in a same layer as and has an integral structure with the second sense unit.

However, in the above-mentioned touch screen, when the first manner is adopted to dispose the first sense units and the second units, each column of the first sense units has a larger resistance and a length of the metal bright between the every two adjacent second sense units of each row of the second sense units is too long, to affect a touch effect of the touch screen and a display effect of a display device having the above-mentioned touch screen. When the second manner is adopted to dispose the first sense units and the second units, each row of the second sense unit has a larger resistance and a length of the metal bright between the every two adjacent first sense units of each column of the first sense units is too long, to affect a touch effect of the touch screen and a display effect of a display device having the above-mentioned touch screen.

SUMMARY

The disclosure provides a capacitive touch screen, a method of manufacturing the same and a display device. The touch screen has improved performance.

An embodiment of the disclosure provides a capacitive touch screen comprising a substrate, a plurality of columns of first sense units and a plurality of rows of second sense units formed on the substrate and disposed in a same layer, each column of first sense units including a plurality of first sense units arranged in a first direction, each row of second sense units including a plurality of second sense units arranged in a second direction perpendicular to the first direction, every two adjacent first sense units of each column of the first sense units being electrically connected by a first connection pattern, and every two adjacent second sense units of each row of the second sense units being electrically connected by a second connection pattern, wherein in the first connection pattern and the second connection pattern at an intersection point of each column of the first sense units and each row of the second sense units: the first connection pattern comprises a first connection part, at least one first connection bridge and at least one second connection bridge, and the second connection pattern comprises a second connection part, the first connection part and the second connection part are disposed in a same layer and disposed in a same layer as the first sense units, and the second connection part has a closed annular structure; the first connection part is located inside the annular structure and is isolated from the second connection part; the second connection part is isolated from the first sense units, the first connection bridge and the second connection part are insulated from each other, and one end of the first connection bridge is electrically connected with the first connection part and the other end of the first connection bridge is electrically connected with one of the two adjacent first sense units, the second connection bridge and the second connection part are insulated from each other, and one end of the second connection bridge is electrically connected with the first connection part and the other end of the second connection bridge is electrically connected with the other of the two adjacent first sense units, and the second connection part is electrically connected with the two adjacent second sense units respectively.

Another embodiment of the disclosure provides a display device comprising the above mentioned touch screen.

Another embodiment of the disclosure provides a method of manufacturing a touch screen, comprising: forming patterns of a plurality of first sense units, a plurality of second sense units, a first connection pattern and a second connection pattern on a substrate, wherein in the first connection pattern and the second connection pattern located at an intersection point of each column of the first sense units and each row of the second sense units: the first connection pattern comprises a first connection part, at least one first connection bridge and at least one second connection bridge, and the second connection bridge comprises a second connection part, the first connection part and the second connection part are disposed in a same layer and disposed in a same layer as the first sense units, and the second connection part has a closed annular structure; the first connection part is located inside the annular structure of the second connection part and is isolated from the second connection part; the second connection part is isolated from the first sense units, the first connection bridge and the second connection part are insulated from each other, and one end of the first connection bride is electrically connected with the first connection part and the other end of the first connection bridge is electrically connected with one of two adjacent first sense units, the second connection bridge and the second connection part are insulated from each other, and one end of the second connection bridge is electrically connected with the first connection part and the other end of the second connection bridge is electrically connected with the other of the two adjacent first sense units, and the second connection part is electrically connected with two adjacent second sense units respectively.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Figure 1:
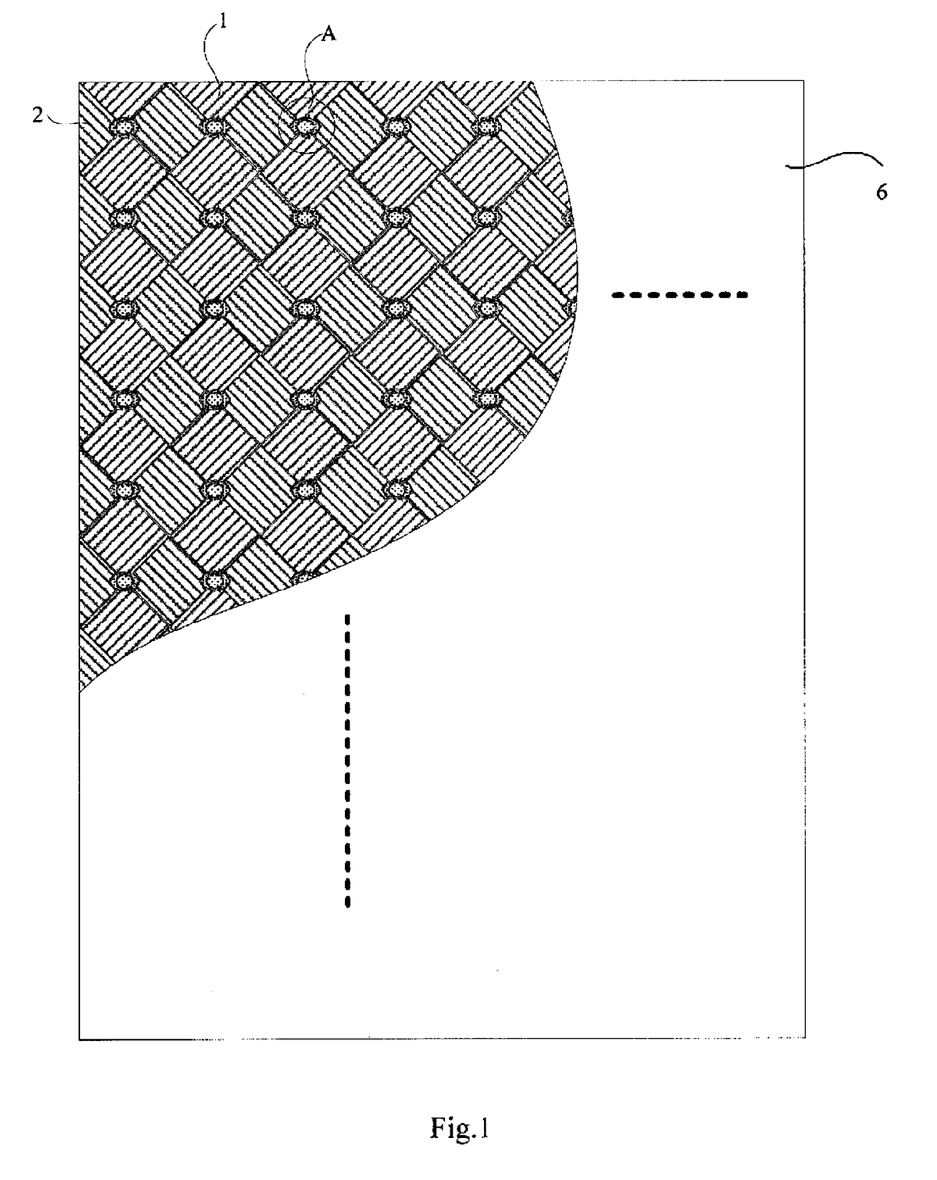
FIG. 1 is a structural schematic diagram of a capacitive touch screen provided by an embodiment of the disclosure.
Figure 2:
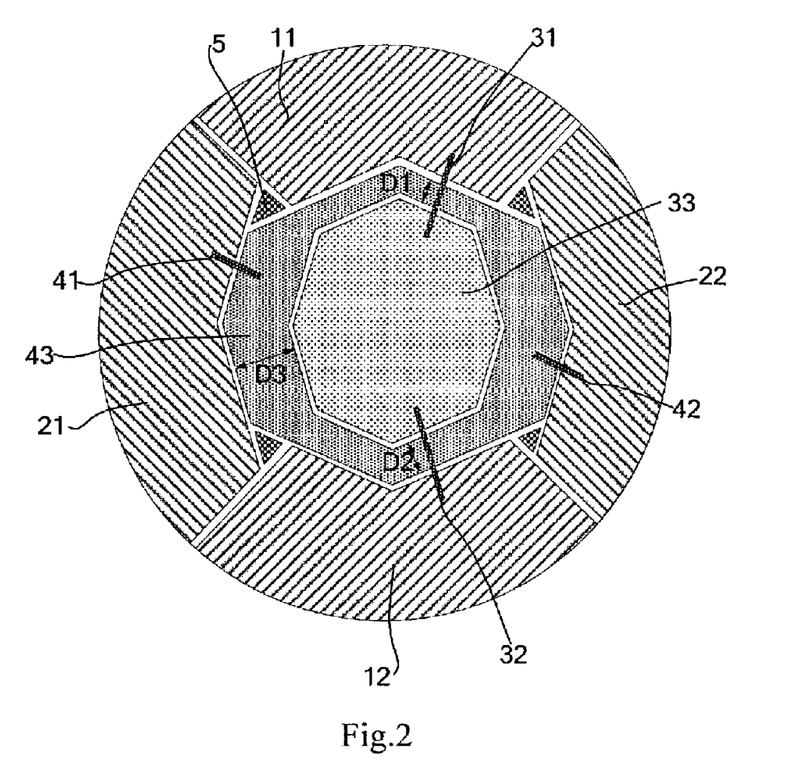
FIG. 2 is a partial enlarged diagram of portion A of FIG. 1.

Refer to FIGS. 1 and 2, a capacitive touch screen provided by the disclosure comprises a substrate 6, a plurality of columns of first sense units 1 and a plurality of rows of second sense units 2 formed on the substrate 6 and disposed in a same layer. A multiple of the first sense units 1 of each column of the first sense units 1 are arranged in a first direction, and a multiple of the second sense units 2 of each row of the second sense units 2 are arranged in a second direction perpendicular to the first direction. Every two adjacent first sense units of each column of the first sense units 1 are connected by a first connection pattern, and every two adjacent second sense units 2 of each row of the second sense units 2 are connected by a second connection pattern. In the first connection pattern and the second connection pattern at an intersection point of each column of the first sense units 1 and each row of the second sense units 2, two adjacent first sense units 11 and 12 of one column of the first sense units 1 and a connection pattern therebetween as well as two adjacent second sense units 21 and 22 of one row of the second sense units 2 and a connection pattern therebetween illustrated in FIG. 2 are described as an example.

The first connection pattern comprises a first connection part 33, at least one first connection bridge 31 and at least one second connection bridge 32. The second connection pattern comprises a second connection part 43, at least one third connection bridge 41 and at least one fourth connection bridge 42.

The first connection part 33 and the second connection part 43 are disposed in a same layer, and are disposed in a same layer as the first sense unit 11 and the first sense unit 12. The second connection part 43 has a closed annular structure. The first connection part 33 is located inside the annular structure of the second connection part 43, and is isolated from the second connection part 43. The second connection part 43 is isolated from the first sense unit 11, the first sense unit 12, the second sense unit 21 and the second sense unit 22.

Each first connection bridge 31 is insulated from the second connection part 43, and one end of the first connection bridge 31 is electrically connected with the first connection part 33 and the other end of the first connection bridge 31 is electrically connected with the first sense unit 11.

Each second connection bridge 32 is insulated from the second connection part 43, and one end of the second connection bridge 32 is electrically connected with the first connection part 33 and the other end of the second connection bridge 32 is electrically connected with the first sense unit 12.

One end of each third connection bridge 41 is electrically connected with the second connection 43, and the other end of the third connection bridge 41 is electrically connected with the second sense unit 21.

One end of each fourth connection bridge 42 is electrically connected with the second connection 43, and the other end of the fourth connection bridge 42 is electrically connected with the second sense unit 22.

As illustrated in FIG. 2, in the above mentioned touch screen, in each column of the first sense units 1, when adjacent first sense units 11 and 12 are connected, the first sense unit 11 is connected with the first connection part 33 by at least one first connection bridge 31, and the first sense unit 12 is connected with the first connection part 33 by at least one first connection bridge 32, to achieve an electrical connection between the first sense unit 11 and the first sense unit 12. Because both a resistance of the first connection bridge 31 and a resistance of the second connection bridge 32 are far less than a resistance of material of the first sense units 11 and 12, each column of the first sense units 1 have a smaller resistance, and each of the first connection bridge 31 and the second connection bridge 32 has a shorter length. The first connection bridge 31 and the second connection bridge 31 has less affect on a display effect of a display device with the above mentioned touch screen. Likewise, in each row of the second sense units, when adjacent second sense units 21 and 22 are connected, the second sense unit 21 is connected with the second connection part 43 by at least one third connection bridge 41, and the second sense unit 22 is connected with the second connection part 43 by at least one fourth connection bridge 42, to achieve an electrical connection between the second sense unit 21 and the second sense unit 12. Because both a resistance of the third connection bridge 41 and a resistance of the fourth connection bridge 42 are far less than a resistance of material of the second sense units 21 and 22, each column of the second sense units 2 have a smaller resistance, and each of the third connection bridge 41 and the fourth connection bridge 42 has a shorter length. The third connection bridge 41 and the fourth connection bridge 41 has less affect on a display effect of a display device with the above mentioned touch screen. Thus, the above mentioned touch screen has a better performance.

In one embodiment, as illustrated in FIG. 2, in the above mentioned touch screen, a fill part pattern 5 for filling a gap is provided at a gap between every adjacent first sense units and second sense units, in order not to influence an appearance of the whole touch screen when defining shapes of respective first sense units and second sense units. Because a color of the first sense unit and the second sense unit formed in the touch screen is different from a color of a gap formed between respective sense units, the fill part pattern 5 may reduce color difference of the appearance of the touch screen due to too large gaps between the first sense units, between the second sense units and between the first sense unit and the second sense unit.

In one embodiment, as illustrated in FIG. 2, in a first connection pattern and a second connection pattern at an intersection point of each column of the first sense units and each row of the second sense units, a width of portions of the second connection part 43 intersected with each of the first connection bridge 31 and the second connection bridge 32 (intersection portion) is smaller than a width of a widest portion of the second connection part 43, in order to further reduce the length of each of the first connection bridge 31 and a second connection bridge 32. As illustrated in FIG. 2, both a width D1 of a portion crossed with the first connection bridge 31 of the second connection part 43 and a width D2 of a portion crossed with the second connection bridge 32 of the second connection part 43 are less than a width D3 of the widest portion of the second connection part 43, so that lengths of the first connection bridge 31 and the second connection bridge 32 may be made very small, to further reduce affects of the first connection bridge 31 and the second connection bridge 32 on displaying of the display device.

For example, in each first connection pattern, the first connection bridge 31 is of a linear line type or a fold line type, and the second connection bridge 32 is of a linear line type or a fold line type.

Due to visual characteristics of human's eyes, an identification degree on oblique patterns is lower than an identification degree on horizontal to or perpendicular patterns. Therefore, in order to reduce the identification degree of the human's eyes on the first connection bridge 31, the second connection bridge 32, the third connection bridge 41 and/or the fourth connection bridge 42 to further displaying effects of the display device, in an embodiment, in each first connection pattern, when the first connection bridge 31 is of a linear line type, as illustrated in FIG. 2, an extending direction of each first connection bridge 31 and a first direction have an included angle larger than 0° and smaller than 90° therebetween; when the first connection bridge 31 is of a fold line type, each first connection bridge 31 comprises at least two fold line parts which are connected in sequence, and an extending direction of each fold line part and the first direction have an included angle larger than 0° and smaller than 90° therebetween.

Of course, in another embodiment, in each first connection pattern, when the second connection bridge 32 is of a linear line type, an extending direction of each second connection bridge 32 and the first direction have an included angle larger than 0° and smaller than 90° therebetween; when the second connection bridge 32 is of a fold line type, each second connection bridge 32 comprises at least two fold line parts which are connected in sequence, and an extending direction of each fold line part and the first direction have an included angle larger than 0° and smaller than 90° therebetween.

Likewise, in another embodiment, in each second connection pattern, the third connection bridge 41 and the fourth connection bridge 42 are of a linear line type, and an extending direction of each third connection bridge 41 and the first direction have an included angle larger than 0° and smaller than 90° therebetween, and an extending direction of each fourth connection bridge 42 and the first direction have an included angle larger than 0° and smaller than 90° therebetween.

For example, in each second connection pattern, the extending direction of the third connection bridge 41 is parallel to the extending direction of the fourth connection bridge 42.

In the above mentioned touch screen, at least one of the first connection bridge 31, the second connection bridge 32, the third connection bridge 41 and the fourth connection bridge 42 is a metal connection bridge made of metal.

In an embodiment, the substrate 6 of the above mentioned touch screen is a transparent substrate.

In the above mentioned touch screen, positions of a metal layer from which the connection bridges are formed and a transparent electrode layer from which the sense units are formed can be provided in a variety of ways. With a purpose to reduce a thickness of the touch screen, in an embodiment, in the first connection pattern and the second connection pattern at the intersection point of each column of the first sense units 1 and each row of the second sense units 2, the first connection bridge 31, the second connection bridge 32, the third connection bridge 41 and the fourth connection bridge 42 are disposed in a same layer, and are located on a side of the first connection part 33 facing the substrate; an insulation layer is provided between the first connection bridge 31, the second connection bridge 32, the third connection bridge 41, and the fourth connection bridge 42, and the first connection part 33 and the second connection part 43, and a plurality of via holes for connection are provided in the insulation layer. In another embodiment, the first connection bridge 31, the second connection bridge 32, the third connection bridge 41 and the fourth connection bridge 42 are disposed in a same layer and located at a side of the first connection part 33 facing away from the substrate 6; an insulation layer is provided between the first connection bridge 31, the second connection bridge 32, the third connection bridge 41 and the fourth connection bridge 42, and the first connection part 33 and the second connection part 43, and a plurality of via holes for connection are provided in the insulation layer.

Figure 3:
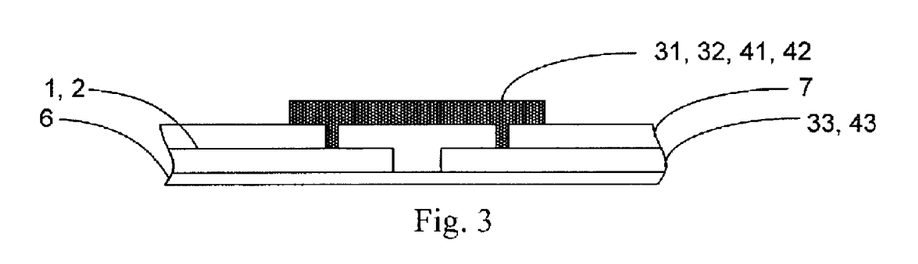
FIG. 3 is a partial cross section schematic diagram near a connection bridge.

FIG. 3 illustrates a partial cross section diagram near the connection bridges. As illustrated in FIG. 3, one end of the connection bridge (31, 32, 41, 42) is connected with the first sense unit 1 or the second sense unit 2 by a via hole, and another end of the connection bridge is connected with the connection part 33 or 42 by a via hole. As such, a corresponding sense unit can be connected with the connection part by corresponding via holes, to achieve an electrical connection between two adjacent sense units. FIG. 3 only schematically illustrates a connection way by via holes in the insulation layer 7. For example, in FIG. 3, when the connection part is the first connection part and the sense unit is the first sense unit, the second connection part is located between the first connection part and the first sense unit in the cross section diagram of FIG. 3, but the second connection part is omitted to illustrate other related structures more clearly.

In an example, a conductivity of the first connection bridge 31, the second connection bridge 32, the third connection bridge 41 and the fourth connection bridge 42 is larger than a conductivity of the first sense unit 1 and the second sense unit 2.

In addition, an embodiment of the disclosure further provides a display device. The display device comprises any one touch screen provided by above mentioned embodiments.

Meanwhile, an embodiment of the disclosure further provides a manufacturing method of any one touch screen provided by above mentioned technical solutions. The manufacturing method comprises:

forming patterns of a plurality of first sense units arranged in a column direction, a plurality of second sense units arranged in a row direction, a first connection pattern and a second connection pattern on a substrate, wherein the first connection pattern and the second connection pattern are located at an intersection point of each column of the first sense units and each row of the second sense units.

The first connection pattern comprises a first connection part, at least one first connection bridge and at least one second connection bridge; and the second connection pattern comprises a second connection part, at least one third connection bridge and at least one fourth connection bridge.

The first connection part and the second connection part are disposed in a same layer and disposed in a same layer as the first sense unit, and the second connection part has a closed annular structure; the first connection part is located inside the annular structure and is isolated from the second connection part; and the second connection part is isolated from the first sense unit and the second sense unit.

Each first connection bridge and the second connection part are insulated from each other, and one end of the first connection bride is electrically connected with the first connection part and the other end of the first connection bridge is electrically connected with a first sense unit.

Each second connection bridge and the second connection part are insulated from each other, and one end of the second connection bride is electrically connected with the first connection part and the other end of the first connection bridge is electrically connected with another first sense unit.

One end of each third connection bridge is electrically connected with the second connection part, and the other end of the third connection bridge is electrically connected with a second sense unit.

One end of each fourth connection bridge is electrically connected with the second connection part, and the other end of the fourth connection bridge is electrically connected with another second sense unit.

For example, in the first connection pattern and the second connection pattern, when the first connection bridge, the second connection bridge, the third connection bridge and the fourth connection bridge are located in a same side of the connection part facing the substrate, forming patterns of the first sense unit, the second sense unit, the first connection pattern and the second connection pattern comprises:

forming a metal layer on the substrate, and forming patterns of the first connection bridge, the second connection bridge, the third connection bridge and the fourth connection bridge by a pattern process;

forming an insulation layer on the patterns of the first connection bridge, the second bridge, the third connection bridge and the fourth connection bridge, and forming a plurality of via holes in the insulation layer by a patterning process to form a pattern of the insulation layer;

forming a transparent conductive layer on the pattern of the insulation layer, and forming the patterns of the above mentioned first sense unit, the second sense unit, the first connection part and the second connection part by a patterning process, wherein the first connection bridge and the second connection bridge are connected with the first connection part by corresponding via holes in the insulation layer, and the third connection bridge and the fourth connection bridge are connected with the second connection part by corresponding via holes in the insulation layer.

For example, in the first connection pattern and the second connection patter, when the first connection bridge, the second connection bridge, the third connection bridge and the fourth connection bridge are located at a side of the connection part facing away from the substrate, forming the patterns of the first sense unit, the second sense unit, the first connection pattern and the second connection pattern comprises:

forming a transparent conductive layer on the substrate, and forming the patterns of the first sense unit, the second sense unit, the first connection part and the second connection part by one patterning process;

forming an insulation layer on the patterns of the first sense unit, the second sense unit and the connection parts, and forming a plurality of via holes in the insulation layer by a patterning process to form the pattern of the insulation layer;

forming a metal layer on the pattern of the insulation layer, and forming patterns of the first connection bridge, the second connection bridge, the third connection bridge and the fourth connection bridge by a patterning process, wherein the first connection bridge and the second connection bridge are connected with the first connection part by corresponding via holes in the insulation layer, and the third connection bridge and the fourth connection bridge are connected with the second connection part by corresponding via holes in the insulation layer.

Figure 4:
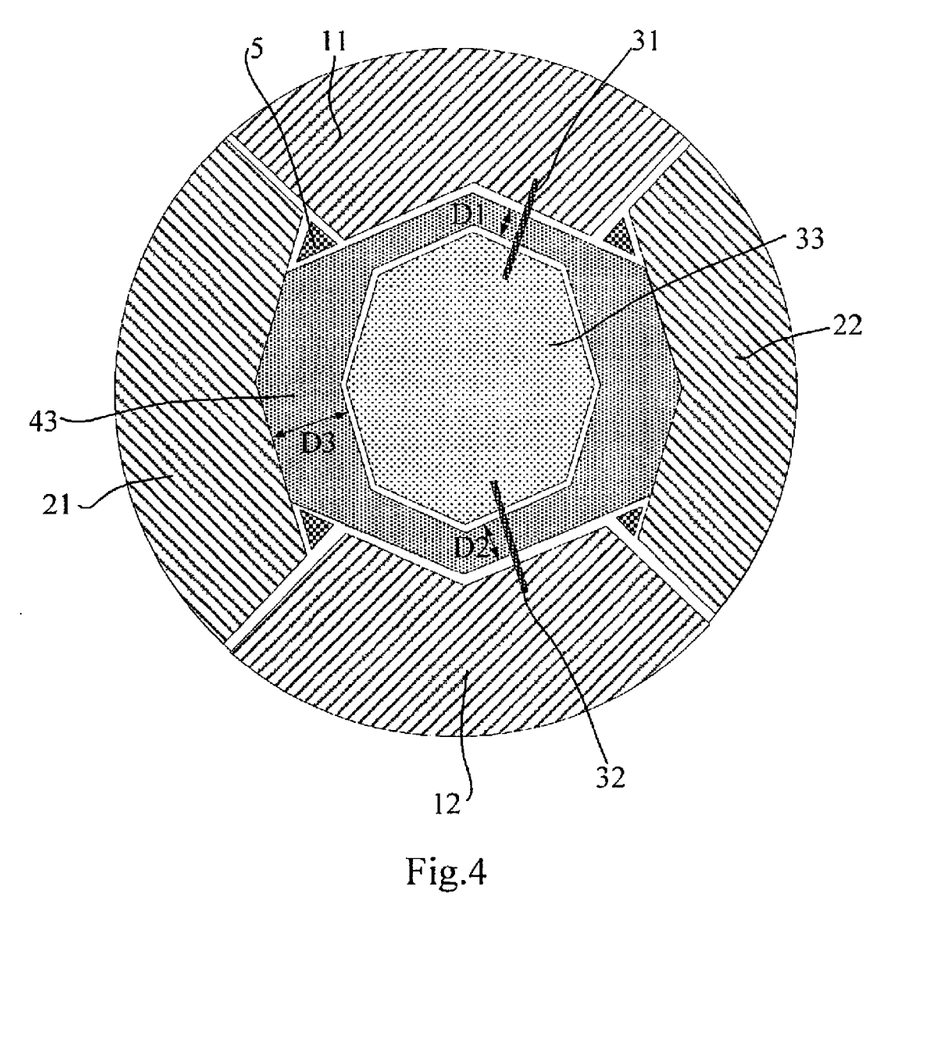
FIG. 4 is a partial enlarged diagram of a capacitive touch screen provided by another embodiment of the disclosure.

In the above mentioned embodiments, the second connection part 43 and the adjacent second sense unit 2 are connected by a connection bridge. However, the embodiments of the disclosure are not limited to this. FIG. 4 illustrates a partial enlarged diagram of a touch screen according to another embodiment, and it illustrates an intersection point of a column of the sense units and a row of the sense units. As illustrated in FIG. 4, the touch screen according to this embodiment does not have any connection bridge to connect the second connection part 43 and the adjacent second sense unit 2. Because the second connection part 43 is formed in a same layer as the first sense unit 1 and the second sense unit 2, the second connection part 43 can be connected with the second sense unit 2 directly without any connection bridge. Therefore, in this embodiment, the second connection part 23 and the adjacent second sense unit 2 are connected directly rather than are isolated. Furthermore, the second connection part 43 is still required to isolate from the first sense unit 1, to avoid short circuit between the column of the sense units and the row of the sense units. Other features of this embodiment can be referred to the above embodiments, and redundant portions will be omitted here. In addition, the embodiment further provides a display device with the touch screen and a method of manufacturing the touch screen, which will be obtained by modifying above mentioned structures. According to the embodiment, because the third connection bridge and the fourth connection bridge are not required, the process is simplified and the yield is improved.

The above mentioned embodiments are only exemplary, and not limitative to the scope of the disclosure. The scopes of the disclosure are defined by the accompanying claims.

This application claims the priority of Chinese Patent Application No. 201510358844.8 filed on Jun. 25, 2015, which is hereby incorporated entirely herein by reference.

The invention claimed is:

1. A capacitive touch screen comprising a substrate, a plurality of columns of first sense units and a plurality of rows of second sense units formed on the substrate and disposed in a same layer, each column of first sense units including a plurality of first sense units arranged in a first direction, each row of second sense units including a plurality of second sense units arranged in a second direction perpendicular to the first direction, every two adjacent first sense units of each column of the first sense units being electrically connected by a first connection pattern, and every two adjacent second sense units of each row of the second sense units being electrically connected by a second connection pattern, wherein in the first connection pattern and the second connection pattern at an intersection point of each column of the first sense units and each row of the second sense units:

the first connection pattern comprises a first connection part, at least one first connection bridge and at least one second connection bridge, and the second connection pattern comprises a second connection part, the first connection part and the second connection part are disposed in a same layer and disposed in a same layer as the first sense units, and the second connection part has a closed annular structure; the first connection part is located inside the annular structure and is isolated from the second connection part; the second connection part is isolated from the first sense units, the first connection bridge and the second connection part are insulated from each other, and one end of the first connection bridge is electrically connected with the first connection part and the other end of the first connection bridge is electrically connected with one of the two adjacent first sense units, the second connection bridge and the second connection part are insulated from each other, and one end of the second connection bridge is electrically connected with the first connection part and the other end of the second connection bridge is electrically connected with the other of the two adjacent first sense units, and the second connection part is electrically connected with the two adjacent second sense units respectively, wherein the second connection pattern further comprises at least one third connection bridge and at least one fourth connection bridge, the second connection part is isolated from the second sense unit, one end of the third connection bridge is electrically connected with the second connection part and the other end of the third connection bridge is electrically connected with one of the two adjacent second sense units, and one end of the fourth connection bridge is electrically connected with the second connection part and the other end of the fourth connection bridge is electrically connected with the other of the two adjacent second sense units.

2. The touch screen of claim 1, wherein the second connection part is connected with the two adjacent second sense units directly.

3. The touch screen of claim 1, wherein a conductivity of the first connection bridge, the second connection bridge, the third connection bridge and the fourth connection bridge is larger than a conductivity of the first sense units and the second sense units.

4. The touch screen of claim 1, wherein in the first connection pattern and the second connection pattern at the intersection point of each column of the first sense units and each row of the second sense units, a width of portions of the second connection part intersected with the first connection bridge is smaller than a width of a widest portion of the second connection part.

5. The touch screen of claim 1, wherein the first connection bridge is of a linear line type or a fold line type, and the second connection bridge is of a linear line type or a fold line type.

6. The touch screen of claim 5, wherein the first connection bridge is of the linear line type, an extending direction of the first connection bridge and the first direction have an included angle larger than 0° and smaller than 90° therebetween; or the first connection bridge is of the fold fine type, the first connection bridge comprises at least two fold line parts which are connected in sequence, and an extending direction of each of the fold line parts and the first direction have an included angle larger than 0° and smaller than 90° therebetween.

7. The touch screen of claim 5, wherein the second connection bridge is of the linear line type, an extending direction of the second connection bridge and the first direction have an included angle larger than 0° and smaller than 90° therebetween; or the second connection bridge is of the fold line type, the second connection bridge comprises at least two fold line parts which are connected in sequence, and an extending direction of each of the fold line parts and the first direction have an included angle larger than 0° and smaller than 90° therebetween.

8. The touch screen of claim 1, wherein the third connection bridge and the fourth connection bridge are of a linear line type, and an extending direction of the third connection bridge and the first direction have an included angle larger than 0° and smaller than 90° therebetween, and an extending direction of the fourth connection bridge and the first direction have an included angle larger than 0° and smaller than 90° therebetween.

9. The touch screen of claim 8, wherein the extending direction of the third connection bridge is parallel to the extending direction of the fourth connection bridge.

10. The touch screen of claim 1, wherein at least one of the first connection bridge, the second connection bridge, the third connection bridge and the fourth connection bridge is a metal connection bridge made of metal.

11. The touch screen of claim 1, wherein in the first connection pattern and the second connection pattern at the intersection point of each column of the first sense units and each row of the second sense units:

the first connection bridge, the second connection bridge, the third connection bridge and the fourth connection bridge are disposed in a same layer, and are located on a side of the first connection part facing the substrate; an insulation layer is provided between the first connection bridge, the second connection bridge, the third connection bridge and the fourth connection bridge, and the first connection part and the second connection part, and a plurality of via holes are provided in the insulation layer; or the first connection bridge, the second connection bridge, the third connection bridge and the fourth connection bridge are disposed in a same layer and located at a side of the first connection part facing away from the substrate; an insulation layer is provided between the first connection bridge, the second connection bridge, the third connection bridge and the fourth connection bridge, and the first connection part and the second connection part, and a plurality of via holes are provided in the insulation layer.

12. A display device, comprising the touch screen of claim 1.

13. A method of manufacturing a touch screen, comprising:

forming patterns of a plurality of first sense units, a plurality of second sense units, a first connection pattern and a second connection pattern on a substrate, wherein in the first connection pattern and the second connection pattern located at an intersection point of each column of the first sense units and each row of the second sense units:

the first connection pattern comprises a first connection part, at least one first connection bridge and at least one second connection bridge, and the second connection bridge comprises a second connection part, the first connection part and the second connection part are disposed in a same layer and disposed in a same layer as the first sense units, and the second connection part has a closed annular structure; the first connection part is located inside the annular structure of the second connection part and is isolated from the second connection part; the second connection part is isolated from the first sense units, the first connection bridge and the second connection part are insulated from each other, and one end of the first connection bridge is electrically connected with the first connection part and the other end of the first connection bridge is electrically connected with one of two adjacent first sense units, the second connection bridge and the second connection part are insulated from each other, and one end of the second connection bridge is electrically connected with the first connection part and the other end of the second connection bridge is electrically connected with the other of the two adjacent first sense units, and the second connection part is electrically connected with two adjacent second sense units respectively, wherein the second connection pattern further comprises at least one third connection bridge and at least one fourth connection bridge, the second connection part is isolated from the second sense unit, one end of the third connection bridge is electrically connected with the second connection part and the other end of the third connection bridge is electrically connected with one of the two adjacent second sense units, and one end of the fourth connection bridge is electrically connected with the second connection part and the other end of the fourth connection bridge is electrically connected with the other of the two adjacent second sense units.

14. The method of manufacturing the touch screen of claim 13, wherein in the first connection pattern and the second connection pattern, the first connection bridge, the second connection bridge, the third connection bridge and the fourth connection bridge are located in a side of the connection part facing the substrate, forming the patterns of the first sense units, the second sense units, and the first connection pattern and the second connection pattern on the substrate comprises:

forming a metal layer on the substrate, and forming patterns of the first connection bridge, the second connection bridge, the third connection bridge and the fourth connection bridge by a patterning process;

forming an insulation layer on the patterns of the first connection bridge, the second bridge, the third connection bridge and the fourth connection bridge, and forming a plurality of via holes in the insulation layer by a patterning process to form a pattern of the insulation layer; and forming a transparent conductive layer on the pattern of the insulation layer, and forming patterns of the first sense units, the second sense units, the first connection part and the second connection part.

15. The method of manufacturing the touch screen of claim 13, wherein in the first connection pattern and the second connection pattern, the first connection bridge, the second connection bridge, the third connection bridge and the fourth connection bridge are located at a side of the connection part facing away from the substrate, forming the patterns of the first sense units, the second sense units, the first connection pattern and the second connection pattern comprises:

forming a transparent conductive layer on the substrate, and forming the patterns of the first sense units, the second sense units, the first connection part and the second connection part by one patterning process;

forming an insulation layer on the patterns of the first sense units, the second sense units and the connection parts, and forming a plurality of via holes in the insulation layer by a patterning process to form a pattern of the insulation layer; and forming a metal layer on the pattern of the insulation layer, and forming patterns of the first connection bridge, the second connection bridge, the third connection bridge and the fourth connection bridge by a patterning process.

16. The display device of claim 12, wherein the second connection part is connected with the two adjacent second sense units directly.

17. The display device of claim 12, wherein the second connection pattern further comprises at least one third connection bridge and at least one fourth connection bridge, the second connection part is isolated from the second sense unit, one end of the third connection bridge is electrically connected with the second connection part and the other end of the third connection bridge is electrically connected with one of the two adjacent second sense units, and one end of the fourth connection bride is electrically connected with the second connection part and the other end of the fourth connection bridge is electrically connected with the other of the two adjacent second sense units.

18. The display device of claim 17, wherein a conductivity of the first connection bridge, the second connection bridge, the third connection bridge and the fourth connection bridge is larger than a conductivity of the first sense units and the second sense units.

* * * * *